United States Patent [19]

Wagner

[11] 4,185,192

[45] Jan. 22, 1980

[54] ALIGNMENT SYSTEM USING TWO PHOTOCELLS DIRECTED AT EACH OTHER

[75] Inventor: George R. Wagner, Santa Ana, Calif.

[73] Assignees: Frank E. Maddocks, III; Dennis E. Belli, both of North Hollywood, Calif.

[21] Appl. No.: 890,277

[22] Filed: Mar. 27, 1978

[51] Int. Cl.² .................... G01B 11/26; G01D 21/04
[52] U.S. Cl. .................................. 250/221; 356/152; 356/400
[58] Field of Search ............. 250/221, 201, 204, 223, 250/561; 356/1, 141, 152, 400; 340/555, 556, 628, 629, 630

[56] References Cited

U.S. PATENT DOCUMENTS

| | | | |
|---|---|---|---|
| 2,595,993 | 5/1952 | Templeman et al. | 250/221 |
| 3,527,953 | 9/1970 | Chitayat | 250/561 |
| 3,534,499 | 10/1970 | Chaffee | 250/221 X |
| 3,885,872 | 5/1975 | Howe, Jr. et al. | 356/1 X |
| 4,059,758 | 11/1977 | Wilwerding | 250/201 |
| 4,112,309 | 9/1978 | Nakazawa et al. | 250/560 |

*Primary Examiner*—David C. Nelms
*Assistant Examiner*—Edward P. Westin
*Attorney, Agent, or Firm*—Romney, Schaap, Golant, Disner & Ashen

[57] ABSTRACT

A passive optical switching apparatus for use with a sales display device, or with a secret security device or with a safety device. The apparatus includes two photo resistor systems which are positioned so that their optical axes and field of view intersect. Also included is the complementary electronic circuitry. If a light change occurs within the region defining the intersection a switching signal is created to trigger the device to which it is attached.

2 Claims, 6 Drawing Figures

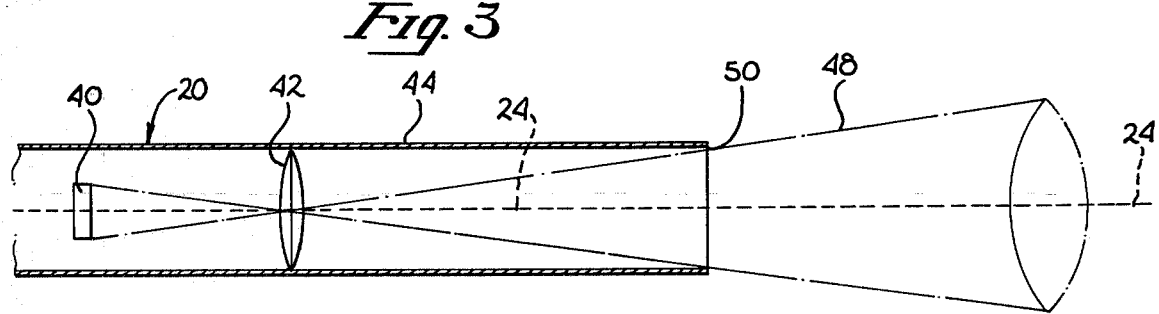
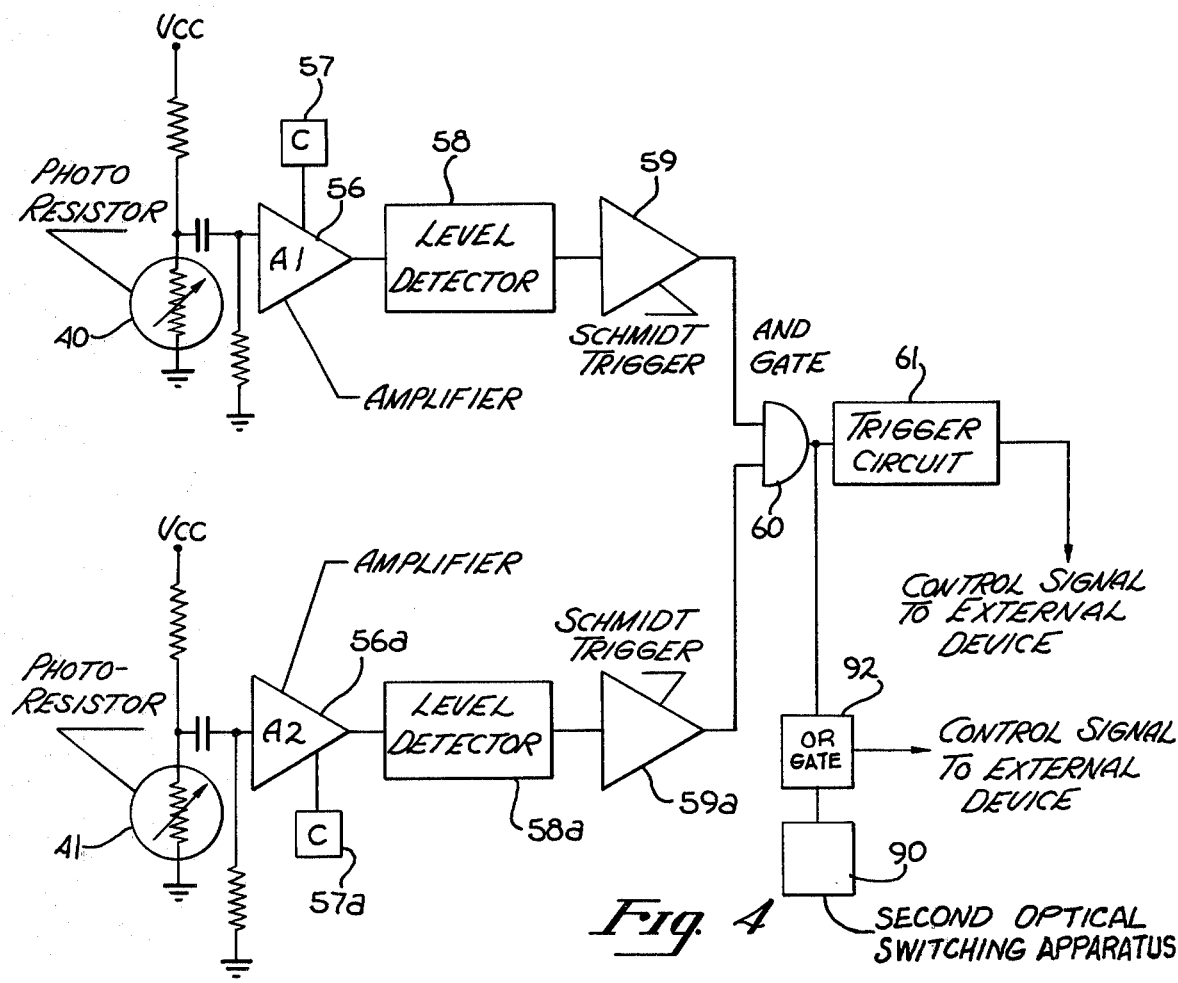

ALIGNMENT SYSTEM USING TWO PHOTOCELLS DIRECTED AT EACH OTHER

BACKGROUND OF THE INVENTION

1. Field of the Invention

The present invention relates to a switching apparatus, and more particularly to a simple and inexpensive optical switching apparatus which can function as a field disturbance sensor in a number of different types of instruments.

2. Description of the Prior Art

Optical switching devices have been known for some time. Very broadly, these may be divided into two categories. The first category includes devices having a light source and a photo-responsive element. These devices are commonly part of a system for automatically opening doors, emitting an audible signal when a door is opened manually and as a security device. The second category includes devices which are passive in that there is no artificial light source. Rather, the system is actuated by changes in the ambient light. An advantage in such a system is that it uses less power and may be more easily secreted. Such a system is ideal for security purposes. In general, the passive optical systems include two photo-responsive devices placed side by side so as to have almost identical fields of view. That is, the ambient light which is within the field "viewed" by the photo-responsive element is nearly identical for each of the two elements since they are placed in the same plane within close proximity to one another. While such a system is desirable in certain applications it has its limitations. For example, if a relatively small region was to be monitored at a distance from the photo-responsive elements, the side by side passive optical system would not work.

SUMMARY OF THE INVENTION

The present invention provides an improved optical switching apparatus of the passive kind which allows select regions to be monitored. The new optical switching apparatus comprises a first photo resistor element having an optical axis and a cone shaped field of view for sensing ambient light; a second photo resistor element having an optical axis and a cone shaped field of view spaced from the first photo resistor element and positioned such that the optical axis of the second photo resistor intersects the optical axis of the first photo resistor element; means for communicating a signal from the first photo resistor element; means for communicating a signal from the second photo resistor element; gate means for receiving said signals from the first and the second photo resistor elements and for providing an output signal only when signals from the first photo resistor element and the second photo resistor element are received substantially simultaneously; and means for mounting said first and second photo resistor elements, said signal communicating means, and the gate means.

An aim of the present invention is to provide an optical switching apparatus for monitoring a predetermined specific region. Another aspect of the present invention is to provide an optical switching apparatus which is simply constructed, reliable and relatively inexpensive. Still another object of the present invention is to provide an optical switching apparatus which may be used for indicating alignment of relatively movable elements.

The foregoing objects, advantages, features and results of the present invention together with various other objects, advantages, features and results thereof which will be evident to those skilled in the art in light of this disclosure may be achieved with the exemplary embodiments of the invention described in detail hereinafter and illustrated in the accompanying drawings.

BRIEF DESCRIPTION OF THE DRAWINGS

FIG. 3 is a diagrammatic perspective view of a photo resistor element and housing illustrating its "field of view".

FIG. 4 is a diagrammatic view of the electronic circuitry of which the photo resistor element is a part.

DESCRIPTION OF THE PREFERRED EMBODIMENTS

Figure 1:
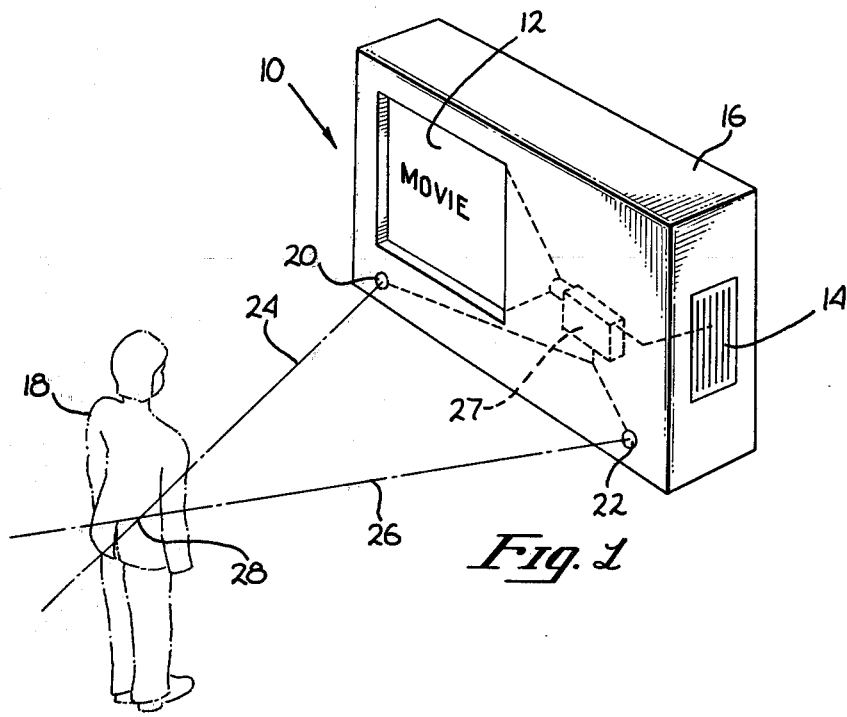
FIG. 1 is a diagrammatic perspective view of a sales display which is actuated by the inventive optical switching apparatus.

While the present invention is susceptible of various modifications and alternative constructions, embodiments are shown in the drawings and will herein be described in detail. It should be understood, however, that it is not the intention to limit the invention to the particular forms disclosed; but on the contrary the intention is to cover all modifications, equivalences and alternative constructions falling within the spirit and scope of the invention as expressed in the appended claims.

Referring now to FIG. 1 there is exemplified the manner in which the subject optical switching apparatus may be used for an advertising display 10. The display includes a video portion such as a screen 12, and an audio system 14 within a housing 16. It is contemplated that the housing is located to one side of a pathway along which potential customers are expected to pass as exemplified by a person 18. Also within the housing 16 are two photo resistor systems 20, 22 having optical axes depicted by center lines 24, 26 respectively, the elements being connected to a mounting container 27 for housing the electronic circuitry to be described in relation to FIG. 4. As will be explained in more detail hereinbelow, the optical switching apparatus actuates when there is a disturbance of the light at the region where the optical axes intersect which in FIG. 1 is designated with the numeral 28. When someone walks through the intersection point 28 a signal is generated to activate the audio and video portions of the display apparatus. It can be appreciated that the device described automatically functions when a potential customer is passing through the preselected region. Such a system has an advantage over previous systems which either were on a preselected but rigid time sequence whether or not anyone was nearby to appreciate the display, or were manually operated thereby requiring some other means to generate an interest in the first instance.

It is to be clearly understood that while a sales display device is shown with the optical switching apparatus numerous other devices may be operated. For example, the optical switching apparatus may be used as part of a secret security device or as part of a safety device on machinery.

Figure 2:
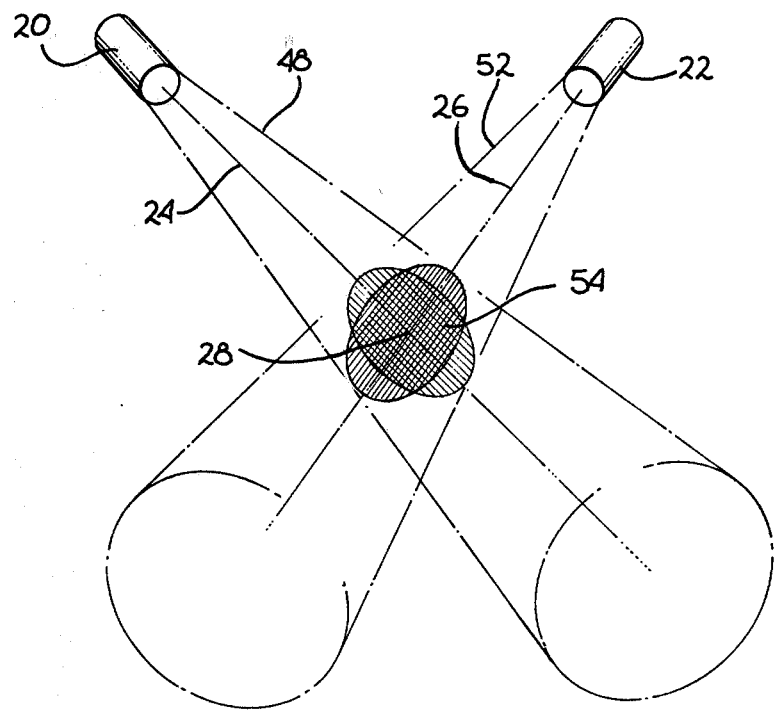
FIG. 2 is a perspective view of two photo resistor elements and their intersecting fields of view, the region of intersection being that space selected for monitoring.

A major advantage of the present invention is its simplicity, reliability and relative inexpensiveness. Referring now to FIGS. 2 and 3 there is illustrated in more detail the photo resistor systems. As can be seen in FIG. 3 the photo resistor system 20 comprises a photo resistor element 40 such as a photo transistor, photo diode, photo resistor or photo electric cell. This element is placed behind a lens 42 and surrounded by a relatively movable sleeve 44. Depicted as a center line 24 is the optical axis and positioned about the optical axis is a cone shaped "field of view" 48. This field of view is merely the three dimensional region from which light may be sensed by the photo resistor element 40. It may be appreciated that by moving the sleeve 44 relative to the lens 42 the field of view may be broadened or narrowed; the scope of the field of view is a function of the distance of the sleeve end 50 from the lens 42. The closer the end 50 is to the lens the broader or larger is the field of view.

Referring to FIG. 2 the optical axis 24 and the field of view cone 48 of the photo resistor system 20 may be compared to the optical axis 26 and a field of view cone 52 of the photo resistor system 22. It is apparent that the only field of view in common to both the photo resistor systems is that region which is designated 54 located about the intersection 28 of the optical axes. The space between the region 54 and the photo resistor systems 20 and 22 and the space beyond region 54 may be within the field of view of one of the systems, but not both. As will be explained in relation to FIG. 4, a switching signal will not be achieved unless signals are received substantially simultaneously from the circuitry to the photo resistor system 20 and from the circuitry relating to the photo resistor system 22. If an object disturbed the light in the field of view between the region 54 and the photo resistor systems 20 and 22 there would not be a signal unless both of these fields were disturbed simultaneously. The same would be true of the field of view beyond the region 54; unless both fields were disturbed simultaneously the circuit would not trigger. While it is possible that a planned disturbance of the two fields of view can be accomplished at the same time, under normal circumstances the region 54 can be preselected and arranged so that simultaneous disturbances outside the region will not be likely.

Referring to FIG. 4, the electronic circuitry includes the photo resistor element 40 of the photo resistor system 20 and a photo resistor element 41 of the system 22. Each of the photo resistor elements are part of a voltage divider network. As ambient light varies, the resistance of the photo resistor element varies which in turn causes a change in the voltage drop across the photo resistor elements. The voltage drop is RC coupled to an amplifier such as the amplifier 56 so that only changes in voltage are seen at the input of the amplifier. The purpose of the amplifier is to increase the AC signal so that it is of sufficient strength to be usable. A control circuit 57 is provided to control the sensitivity of the amplifier. The output from the amplifer becomes the input to a level detector 58 and a Schmidt trigger 59. The level detector is biased so that the level detector output is zero unless the input is at a predetermined voltage. The Schmidt trigger circuit is used to produce a pulse when a pulse is applied to its input. The output of the Schmidt trigger is fed to an AND gate 60 which may be comprised of two diodes and a transistor. One of the diodes communicates the signal relating to the photo resistor element 40 while the other diode communicates the signal relating to the photo resistor element 41. When negative pulses are fed to the diodes, the transistor will be biased in such a direction that it will be turned on. This will cause current to flow through a trigger circuit 61 which may be comprised of a resistor and a silicone controlled rectifier. The output of the trigger circuit may be used to actuate the audio and video portions of the display device for example, or it may be used to turn on other types of devices as mentioned hereinabove. For purposes of brevity the means for communicating a signal initiated by the photo resistor 41 has been labeled with the same numbers as those used for the photo resistor 40 except that a small "a" has been added.

Figure 5:
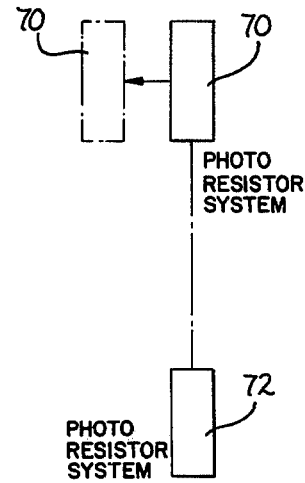
FIG. 5 is a diagrammatic plan view of aligned photo resistor elements.
Figure 6:
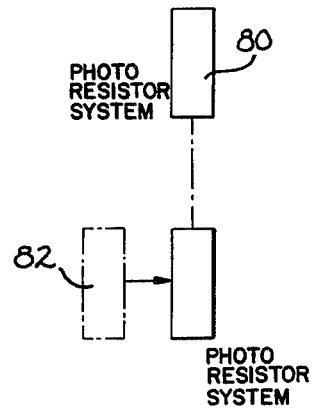
FIG. 6 is a diagrammatic plan view of misaligned photo resistor elements.

Emphasizing the advantage of versatility, reference is made to FIGS. 5 and 6. Shown in diagrammatic form are the two photo resistor systems 70 and 72. As can be seen the optical axes of the two systems are aligned so that each is in the field of view of the other. If the photo resistor system 70 moves to the left as illustrated, each of the systems will perceive a light change simultaneously, thereby causing a switching signal to be created. In FIG. 6 another pair of photo resistor systems 80 and 82 are shown in which the optical axes are out of alignment. However, if the system 82 moves rightwardly into alignment with the system 80 then each system will simultaneously see a change of light and thus create a switching signal.

The arrangements shown in FIGS. 5 and 6 may be used as part of a safety device or a device indicating alignment or misalignment of two relatively movable parts.

In operation the apparatus works in a very simple manner. Once a light change has occurred in the predetermined selected region, such as region 54, FIG. 2 the photo resistor elements of each of the circuits shown in FIG. 4 will undergo a change of resistance which in turn causes simultaneous signals to be received at the AND gate 60. Under such circumstances, the AND gate causes an output signal, which in turn indicates a change of mode, to activate the remainder of the system. When the system is a sales display unit, the remainder of the system might include the audio and video portions mentioned in relation to FIG. 1. If the system is a security device, then an audio alarm may be activated.

In another variation, a second optical switching apparatus 90, FIG. 4 may be put in the same room as the sensing or original optical switching apparatus. This system would function identically to that already described, except if both systems simultaneously see the light disturbance, no final change of mode signal occurs. For example, the output signals from the AND gate 60 and the second system 90 may be fed to an OR gate 92. A final signal will not issue if the OR gate receives simultaneous signals. In this manner, stray or false alarms will not occur if the system is used for security purposes. For example, such a combined device could be placed in a room, the first system being focused on a door while the second system is focused near the ceiling. If someone comes through the door, then the first system would function as already described. However, if the room is momentarily swept by headlights from an automobile, both systems would pick up the light change and thus no final signal would be emitted since under the circumstances the signal would be a false one.

What is claimed is:

1. An optical switching apparatus comprising:
a first photo resistor element having an optical axis and a cone shaped field of view for sensing ambient light;
a second photo resistor element having an optical axis and a cone shaped field of view spaced from said first photo resistor element and positioned such that the optical axis of said second photo resistor element intersects the optical axis of said first photo resistor element;
means for communicating a signal from said first photo resistor element;
means for communicating a signal from said second photo resistor element;
gate means for receiving said signals from said first and second photo resistor elements and for providing an output signal only when said signals from said first and said second photo resistor elements are received substantially simultaneously, said gate means puts out no signal when the optical axis of said first photo resistor element is in alignment with the optical axis of said second photo resistor element, and said gate means puts out a signal when the optical axis of said first photo resistor element is out of alignment with the optical axis of said second photo resistor element; and
means for mounting said first and said second photo resistor elements and said signal communicating means and said gate means.

2. An optical switching apparatus comprising:
a first photo resistor element having an optical axis and a cone shaped field of view for sensing ambient light;
a second photo resistor element having an optical axis and a cone shaped field of view spaced from said first photo resistor element and positioned such that the optical axis of said second photo resistor element intersects the optical axis of said first photo resistor element;
means for communicating a signal from said first photo resistor element;
means for communicating a signal from said second photo resistor element;
gate means for receiving said signals from said first and said second photo resistor elements and for providing an output signal only when said signals from said first and said second photo resistor elements are received substantially simultaneously, said gate means puts out no signal when the optical axis of said first photo resistor element is out of alignment with the optical axis of said second photo resistor element, and said gate means puts out a signal when the optical axis of said first photo resistor element is in alignment with the optical axis of said second photo resistor element.

* * * * *